US008162242B2

(12) United States Patent
Hofmann et al.

(10) Patent No.: US 8,162,242 B2
(45) Date of Patent: Apr. 24, 2012

(54) METHOD FOR ISOLATING CELLULOSE AND OTHER ADHESIVE MATERIALS DURING THE RECYCLING OF WASTE PLASTICS, IN PARTICULAR MIXED PLASTICS

(75) Inventors: Michael Hofmann, Buxtehude (DE); Alexander Gercke, Bad Oldesloe (DE)

(73) Assignee: CVP Clean Value Plastics GmbH, Buxtehude (DE)

( * ) Notice: Subject to any disclaimer, the term of this patent is extended or adjusted under 35 U.S.C. 154(b) by 207 days.

(21) Appl. No.: 12/515,141

(22) PCT Filed: Nov. 16, 2007

(86) PCT No.: PCT/EP2007/009930
§ 371 (c)(1),
(2), (4) Date: Jun. 17, 2009

(87) PCT Pub. No.: WO2008/058750
PCT Pub. Date: May 22, 2008

(65) Prior Publication Data
US 2010/0043988 A1    Feb. 25, 2010

(30) Foreign Application Priority Data

Nov. 17, 2006   (DE) .......................... 10 2006 054 769
Nov. 17, 2006   (DE) .......................... 10 2006 054 770

(51) Int. Cl.
*B02C 19/00*    (2006.01)
(52) U.S. Cl. ........... 241/19; 241/20; 241/21; 241/24.18; 241/29
(58) Field of Classification Search .................... 241/21, 241/19, 28, 23, 29, 24.18, 24.2, 20
See application file for complete search history.

(56) References Cited

U.S. PATENT DOCUMENTS 5,154,361 A * 10/1992 Willoughby .................... 241/16
2004/0050510 A1    3/2004 Phillips

FOREIGN PATENT DOCUMENTS

| JP | 57-36616 | 2/1982 |
| JP | 6-106536 | 4/1994 |
| JP | 2003-305724 | 10/2003 |
| WO | 2006100044 A1 | 9/2006 |

* cited by examiner

*Primary Examiner* — Mark Rosenbaum
(74) *Attorney, Agent, or Firm* — Vidas, Arrett & Steinkraus P.A.

(57) ABSTRACT

A method for the removal of wood pulp and other adhering substances from waste plastics in the recycling of all types of waste plastics, of mixed plastics (MKS) in particular, in which foils and pieces from thicker plastic parts of if necessary pre-sorted waste plastics are mechanically pre-shredded into flakes or particles up to a preset size, wherein oversizes are sorted out, the shredded product is charged into a disc refiner together with water, wherein the proportion of flakes and other particles is at least 10% of the total volume, substances adhering on the flakes are rubbed down by the co-operating discs of the refiner to a large extent, and are then present as separate substances, and the substances rubbed down are separated from the plastic particles by a suitable separation method.

27 Claims, 6 Drawing Sheets

METHOD FOR ISOLATING CELLULOSE AND OTHER ADHESIVE MATERIALS DURING THE RECYCLING OF WASTE PLASTICS, IN PARTICULAR MIXED PLASTICS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

From WO 2006/100044, the entire contents of which is incorporated herein by reference, a method for shredding and cleaning of waste plastics, mixed plastics in particular, has become known, in which a compacted mass or an agglomerate, respectively, is made from foil scraps or other foil remnants and chopped plastic parts. The agglomerate reduces the volume of the waste plastics drastically, and thus, it can be transported easily. It is used in this condition for energy production to a large extent. In the known method, it is started from the finding that such a compacted mass or agglomerate, respectively, can be easily ground, and the ground product is very suitable for further treatment and upgrading conversion. The grinding takes place in a disc- or drum refiner in the presence of water. The proportion of flakes and other particles is at least 10% of the total volume. Substances adhering on the flakes are rubbed down to a large extent and are present as separate substances. A fine grain fraction is removed from the ground product leaving the refiner. The remaining ground product is washed or mechanically dewatered and dried, respectively. By further treatment, such a ground product can be used as a raw material and/or filler for board materials, as filler for quite different applications, and at corresponding degree of purification even with pure plastics or plastics from sorting processes for the production of plastics components. A further field of application is the production of so-called WPC-parts (Wood Plastics Composites). In the production of such parts, a mixture of wood- and plastic particles is produced either by dry mixing and direct processing, or by compounding with the aid of an extruder, an agglomerator, a heating mixer or a heating-cooling mixer, and processed into moulded articles.

Of course, waste plastics contains a not insignificant fraction of contaminants and adhering substances, of wood pulp in particular, which is of no use for many fields of application. This wood pulp originates from adhesive labels, from composite packages or from incomplete removal of free paper. In plastics from used paper collections, great amounts of wood pulp adhere frequently on the plastics. In the compacting, the wood pulp is melt in or encapsulated, respectively, and arrives in the grinding process due to this. Even after the grinding, wood pulp is still incorporated into individual grains or particles of the ground product or still adheres on the grains or particles of the ground product. When plastics is processed together with wood pulp in an extruder or in an injection moulding machine, the humidity of the wood pulp leads to the generation of water vapour, which makes processing harder or even impossible. In addition, wood pulp in the ground condition has the disadvantage that it attracts moisture by its hygroscopic effects, which persists longer than in the plastic material in a drying process, as the case may be.

EP 515946, the entire contents of which is incorporated herein by reference, discloses a method for separating textile fibres from waste plastics, in which the shredded product is charged into a disc refiner together with water, without previously producing a compacted mass or agglomerate, respectively, from the flakes and the particles.

JP 2003 305 724, the entire contents of which is incorporated herein by reference, discloses a method for separating paint layers from waste plastics, in which the shredded product is charged into a disc refiner together with a solvent, without previously producing a compacted mass or agglomerate, respectively, from flakes and particles.

Compacting or agglomerating, respectively, is a process that requires high apparatus energy consumption and thus is very cost-expensive. Furthermore, agglomerate is not always at hand.

Consequently, the present invention is based on the objective to indicate a method for the removal of wood pulp and other adhering substances from waste plastics in the recycling of waste plastics, which reduces the expense with respect to energy and apparatus.

BRIEF SUMMARY OF THE INVENTION

In the method according to the present invention, if necessary pre-sorted waste plastics is mechanically shredded into flakes of foils or pieces of thicker plastic particles up to a preset size, wherein oversizes are sorted out. Plastics is usually sorted out from collected wastes and shredded with the aid of a shredder or of similar disintegrating devices, so that it can be supplied to the compacting process for instance. It is also known to perform a pre-sorting according to individual types of plastics in a manual or automatic manner. For instance, the recycling or re-use, respectively, of PVC or even PET together with other plastics is a problem. In the method of the present invention, the waste plastics is mechanically shredded so far that the parts do not exceed a certain size. The oversizes are sorted out and if necessary subjected to the shredding process again.

The product shredded in this way is supplied to a disc refiner without previous compacting. The co-operating discs of the same, which are preferably in a distance that approximately corresponds to the thickness of the flakes without adhering substances, rub the substances off from the flakes to a great extent.

In the processing in the disc refiner, the overwhelmingly great advantage is achieved that wood pulp adhering on the plastic flakes, which stems from labels for instance, is completely rubbed off. This holds also for other adhering extraneous materials, in particular for the adhesive of the labels, which is normally not water-soluble. Therefore, the wood pulp is present separately in the output product of the disc refiner. This is mostly not the case in the grinding of compacted mass or agglomerate in a refiner, even in a toothed disc refiner. In the compacted mass or the agglomerate, respectively, the wood pulp is encapsulated or hooked up, respectively, and adheres on or in, respectively, the plastic grains even after grinding. Only by a fine grinding, in a further grinding stage for instance, it is possible to separate wood pulp particles from plastic particles in this, so that a separation is possible afterwards, by suitable methods, like wind sifting methods e.g.

According to the present invention, it is possible to use a drum refiner instead of a disc refiner.

In the present invention, the wood pulp is in a separate form after the flakes have passed the disc refiner, and the separated plastics can continue to pass through the process, i.e. through further stages of grinding and dewatering as the same are known from the method described in the beginning. However, in the present invention a significantly smaller degree of shredding is sufficient for the grinding of the plastics, because the wood pulp is present separately from the plastics anyway. It can be separated by suitable separation methods. Thus, the removal of the wood pulp from the plastics waste is significantly less sumptuous than in conventional methods.

Consequently, even the dirt freight that passes through the disc refiner with the plastics can be extracted from the process in a simple manner with the aid of the present invention, for instance by sieving off the fine fraction.

When using a toothed disc refiner, the teeth are arranged at distances in concentric circles, wherein the gaps between the teeth of a circle and the distance of the refiner discs from each other are sufficiently great to allow the free passage of the flakes or pieces or of the material already ground up to then, respectively. As the shredding of the flakes or pieces proceeds from the inside towards the outside, with a continuous diminution from the inside towards the outside, the product has of course smaller dimensions in the outer region between the toothed discs, than in the region of the supply opening in the axis of the refiner. Accordingly, the distance of the teeth on the circles and the distance of the grinding discs can decrease from the inside towards the outside. Therefore, it holds that the distance is very important, because in spite of the presence of water, otherwise there would be the danger that plastics in the form of pieces seizes in the refiner and clogs the same in a short time.

Toothed disc refiners are per se known. They are used for dispersing wood pulp, as the same comes at hand in the processing of used paper for instance. The wood pulp is given into the toothed disc refiner in a suspension, wherein the material is first treated in a so-called fulling zone in the intake region, before it flows to the tooth rows. Up to now, toothed disc refiners have not been used for shredding not compacted flakes or other plastic pieces and for removing adhering wood pulp. In their hitherto existing purpose of application, toothed disc refiners were intended to separate paper fibres from each other, but not to grind them. It was desired that the fibres were damaged as little as possible in the dispersing process.

According to another embodiment of the present invention, after mechanical dewatering and if necessary removal of fine fractions, the output product can be charged into a sink-float tank, in which a separation of the wood pulp and the particles having a specific gravity>1 from plastic particles having a specific gravity<1 takes place. This method has the advantage that for instance PVC or PET, which have a greater specific gravity than 1, sink down together with the wood pulp, whereas the remaining plastic particles float and can be skimmed out.

According to another embodiment of the present invention, the output product can be supplied to a sieve, in which the wood pulp suspension is removed from the remaining output product by negative pressure. Further, a sieving apparatus according to US 2004/0050510 A1, the entire contents of which is incorporated herein by reference, can be used, yet in the present case, the filter cake is formed by plastic particles however, whereas wood pulp passes through the drum sieve. Finally, after mechanical dewatering, the output product can be supplied to a sorting centrifuge, in which a sorting according to density takes place.

In general, it can be utilized in the extraction of the wood pulp that when there are foil flakes with label stickers, the wood pulp is separated from the plastics practically completely after passing through the disc refiner, and passes over into a dispersion with uniform consistency of matter. Due to the geometric size differences of the dispersed wood pulps and the foil flakes, almost every wet sieving can be used which retains the foil flakes and allows the wood pulp dispersion to pass through. Sorting by density will be used when other plastics like hard plastics e.g. are ground into fine grains in the toothed disc refiner, and thus, separation by geometry is no more applicable.

It has been mentioned already that with the aid of a toothed disc refiner of the indicated type, the effect is achieved that adhering wood pulps and other substances are separated or sheared off, respectively, from plastics. By doing so, conventional methods can be avoided, namely those of cleaning off the wood pulp from foils with adhering wood pulp in a sumptuous manner in dry processes, or to let them pass through a friction washing apparatus, which produces wood pulp waste that cannot be reused in the economic cycles. In the washing methods of the state of the art, the separation of the wood pulps from the plastic materials is often unsatisfactory in separation efficiency, because wood pulp remnants always remain on the plastics due to existing adhesives for labels. In the present invention, the wood pulp is practically completely removed from the plastics already after a first refiner stage, and it has not to pass through the entire treatment process of the plastics. In order to produce starting materials for wood plastic composites, it may be advantageous to let the separated wood pulp pass the process together with the plastics, and to let the same together also in the dryer. Thus, a very homogeneous and well mixed mixture of substances is produced, which is subsequently thickened to a dry blend with suitable machines, like a palltruder for instance, if necessary with the addition of additives and/or other plastics, or is even compounded by heating or heating-cooling mixers or by extruders. If on the contrary the wood pulp is separated beforehand, the purified and if necessary sorted plastics can be re-granulated in an extruder.

The method of the present invention can also be repeated. The output product from the toothed disc refiner can be supplied completely or partly (with 30%, e.g.) immediately to the entrance of the refiner. In the invention, even incompactly compacted material, like for instance sieve pellets, can be used as the input material for the disc refiner. Here, a bonding in the pellets is achieved by interlocking or slight melting of the particles in their edge zones only. This has the effect that flakes dissolve away and wood pulp material adhering on these flakes can be rubbed off efficiently.

As already mentioned also, in the method of the present invention, the flakes from the waste plastics are shredded in the toothed disc refiner relatively slightly. Consequently, it is possible to sort the flakes according to plastics types, by suitable sorting methods for instance. It is also possible to separate them from the grainy product.

When drying in a fluid bed or dispersion dryer, there will be a separation of the flimsy flakes into the filter, whereas the grainy hard plastics are discharged from the dryer. In this way, one utilizes the air sifting effect in this specific type of dryer in order to separate flimsy foil scraps from grainy plastic particles. The same have a different melting flow index (MFI), so that different types of re-granulate result. As flakes and grains are present separately and free of wood pulp, it is possible to sort them into plastics types. The separation methods that are to be applied for this are known. When flakes and/or grains are further sorted according to plastics types, the production of pure plastic granulates is possible.

In the case that this is sufficient, the grinding product, if necessary freed from wood pulp, can be immediately used in certain subsequent processing processes, for instance in the production of plastic components, wood plastic composites or the like. If a more homogeneous product is desired however, the grinding process according to the present invention can be repeated or continued in a further refiner stage.

Besides, the fine fraction freight is advantageously removed from the ground product with the service water, which contains not only fine fractions of plastics but also organic components or other dirt freight that still adheres on the flakes or other plastic particles, or is mixed with the same, respectively. The service water can be either treated further, if necessary after finely sieving off the fine fractions, or be recycled into the process after sieving off the fine fractions.

In case that the separation takes place not before the air sifting process, it cannot be avoided that a plastics fine fraction is contained in the wood pulp. However, the product of sieving or filtering, respectively, can be used further without problems. Fine plastics, above all such ones originating from polyolefin or originating from polyester (PET), yield a very useful material together with wood pulp, for the production of so-called wood plastics composites (WPC). The mixture of plastic fibres is brought into the form of a granulate, by way of an agglomerator for instance, or it is directly spread on a twin calender. Another possibility is compounding, for instance in a special extruder with degassing equipment and if necessary with addition of additives, like maleic anhydride for instance. Even pure plastics of virginal origin, reactor product or high-value plastics from the plastic types sorting can be admixed, in order to achieve selected processing qualities. In this case, a fibre annealing of the plastics is created through this application, so that the admixture of wood chips and wood fibres can be reduced or even omitted. Thus, the treatment of wood chips or wood fibres is no more necessary for the production of WPC, which results in great cost savings. Another economic effect is in the field of waste disposal, where high expenses are otherwise due for the waste disposal of the wood pulp.

The utilisation of a conventional toothed disc refiner, as the same is well known for dispersing wood pulps from used paper, is in principle possible in accordance with the present invention. However, some modifications are needed, as can be derived already from the statements above, in order to achieve the desired advantage, namely shredding with concomitant removal of adhering substances like dirt and/or wood pulp. In one embodiment of the present invention, for this purpose, the first tooth circle starting from the central supply opening is arranged in a certain radial distance from the supply opening and forms a preferably flat intake zone. In another embodiment, it is envisioned that a toothed disc refiner be used in which the distance of the disc areas decreases radially towards the outside continuously, starting from the central supply opening. According to another embodiment, a toothed disc refiner can be used in which a radially outer region of the discs features radial or approximately radial grinding segments, spaced apart in the rotational direction, like those which feature usual discs refiners that have become known for grinding plastics agglomerates. In this context, the grinding segments can be provided with barriers, such that the ground grains are directed towards the neighbouring disc. In this way, an even more effective grinding is achieved.

Finally, it may be provided in the toothed disc refiner of the present invention that the toothed disc contains channels starting from the central supply opening in the perimeter distance of the supply opening, which extend towards the outside over a certain path. The channels, which can decrease in their depth from the inside towards the outside, are in every case sufficiently wide so that they permit the entrance of the plastic material present in pieces, or of the flakes, respectively.

It must still be noted that when cleaning off the wood pulp in the disc refiner, a disintegration of composite materials takes place also, for instance of aluminium foils from plastic flakes.

BRIEF DESCRIPTION OF THE SEVERAL VIEWS OF THE DRAWINGS

The present invention is explained in more detail by means of drawings in the following.

DETAILED DESCRIPTION OF THE INVENTION

Figure 1:
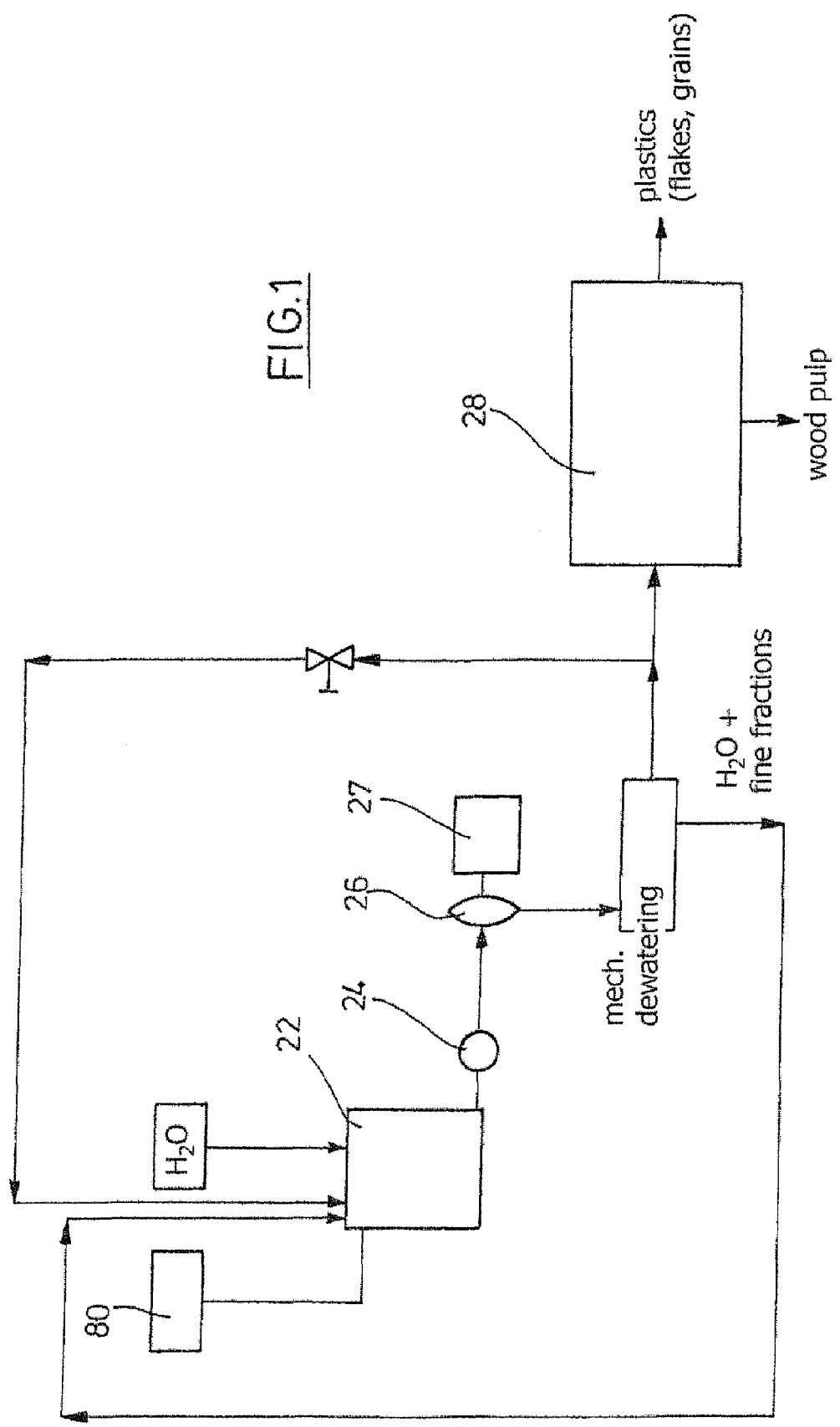
FIG. 1 shows a plant scheme for processing waste plastics, with the aid of one refiner stage of the present invention.

While this invention may be embodied in many different forms, there are described in detail herein a specific preferred embodiment of the invention. This description is an exemplification of the principles of the invention and is not intended to limit the invention to the particular embodiment illustrated In FIG. 1, a toothed disc refiner 26 is suggested, which will be described in detail below. It is driven by a motor 27. From a reservoir 80, plastic flakes and other plastic pieces are charged into a container 22 with water. The plastic flakes and plastic pieces are the result of a pre-shredding, and if necessary pre-sorting. Usually, waste plastics sorted out from waste is at hand in the form of pressed bales.

Before being pressed into bales, or even thereafter, mineral components and metals are sorted out with the aid of a trap for heavy matter. Free paper can be extracted also. Furthermore, sorting according to the types of plastics can be performed, for instance by way of an infrared supported recognition sensing, with subsequent extraction of identified plastics. At option, only the extraction of undesired plastics may take place. The plastic wastes from the opened bales are shredded, wherein flakes result from the shredding of foils, and pieces from three-dimensional or thicker plastic parts. This shredding takes place in a shredder or a disc chopper. A fraction produced in this way must be matched such that no so-called oversize product is generated, which does not fulfill the acceptance criteria for feeding it into the refiner 26. Hence, according to necessity, a sieving out of oversize product has to be installed for this purpose, from the material in pieces above all, the oversize product if necessary being recycled via the shredding apparatus, or even being extracted in this.

By a solids handling pump 24, the flakes and pieces of plastics in the container 22 are supplied with water to the refiner 26, which is a so-called toothed disc refiner, as was already mentioned. It is capable to separate off wood pulps and adhesives adhering on the plastic flakes by friction, and to shred the harder input material into grains. The grinding gap is adjusted such that the flakes pass through essentially unshredded, but adhering substances are rubbed off or sheared off. The output product is subsequently dewatered mechanically, for instance with the aid of a centrifuge or the like. The service water is recycled into the container 22, together with fine fractions, which may also comprise dirt freight. Alternatively, the fine fractions are sieved off before recycling the water. Alternatively, the sieved service water can also be supplied to a processing.

The ground product arrives in an apparatus 28, in which wood pulp is separated from plastics. The toothed disc refiner 26 has the property to rub off wood pulp material adhering on flakes efficiently, so that the wood pulp is present in the ground product separately, in the form of a suspension. The wood pulp, which is separated with the aid of suitable apparatuses, is supplied to a further treatment if necessary. As separation apparatuses serve for instance a conventional sieve, a sieve through which the wood pulp suspension is sucked through, a sorting centrifuge or even a sink-float arrangement, as is per se known. The plastics material freed from wood pulp and being in the form of flakes and grains can be supplied to further processing. It can be ground further, as is known from the method described in the beginning, or even immediately supplied for usage, if necessary after other processing measures.

Separation of the wood pulp from plastics can also take place immediately from out the suspension on the exit of the refiner, preferably with the means indicated above. Dewatering of the plastics fraction is necessary depending on which separation method is used.

Figure 2:
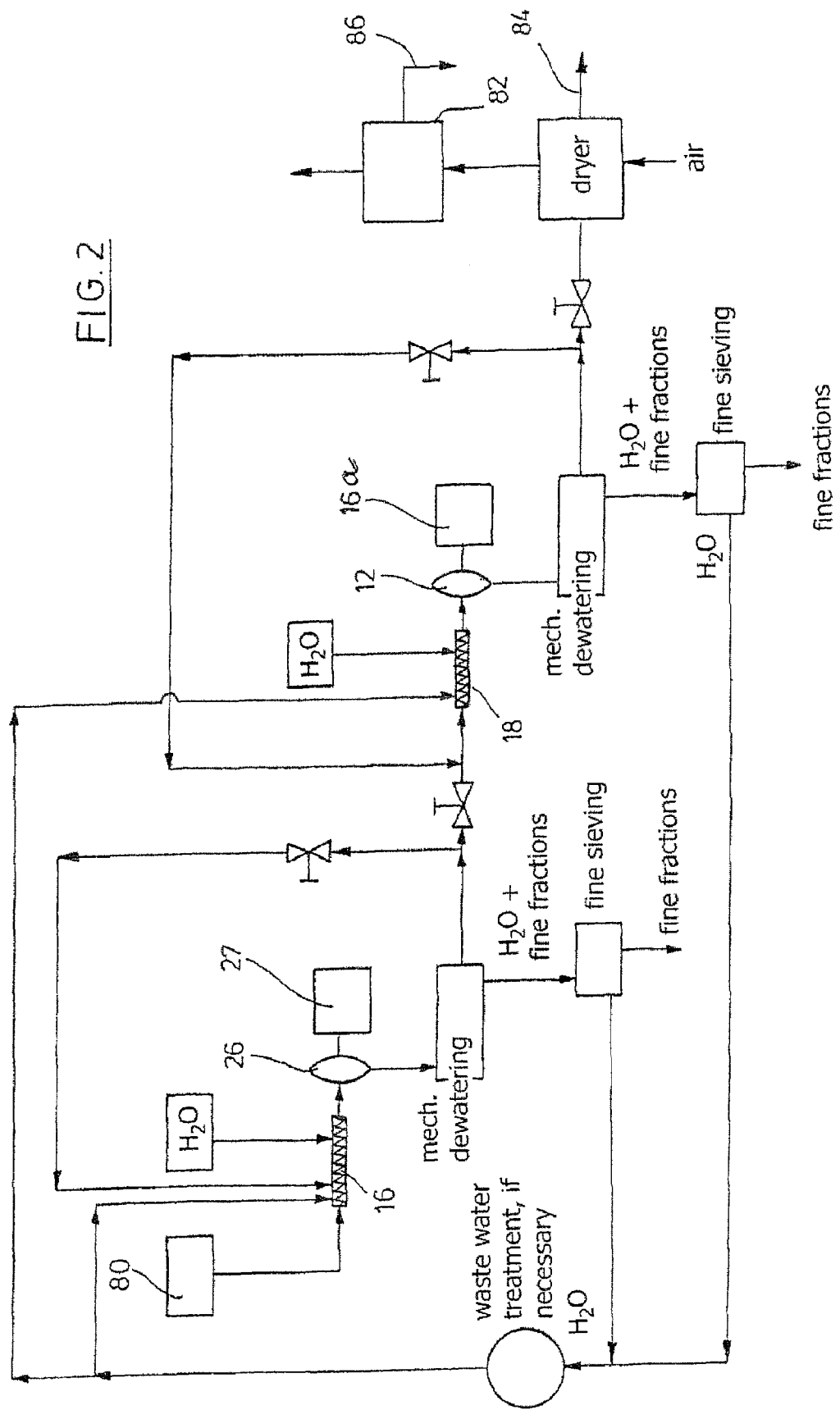
FIG. 2 shows a plant scheme for processing waste plastics, with the aid of two refiner stages of the present invention.

In the plant scheme after FIG. 2, a reservoir of flakes and plastics in pieces is envisioned at 80 again, as was already described with respect to FIG. 1. In the shown case, the flakes and plastic pieces are supplied to the toothed disc refiner 26 via a conveyor screw 16. In the mechanical dewatering, for instance with the aid of a centrifuge, service water and fine fractions are removed and finely sieved, wherein the service water is supplied to a waste water treatment and from there back to the conveyor screw 26, into which fresh water can be fed also, so that predominantly water and to a fraction plastic material is fed into the toothed disc refiner, for instance to at least 10% of the total volume.

The dewatered ground product can be fed back into the toothed disc refiner via the conveyor screw 16, in order to effect a new shredding. Alternatively, it can be fed via a conveyor screw 18 into a further refiner 12, which is driven by a motor 16a. The refiner 12 may be a toothed disc refiner or even another disc refiner with grinding segments, as has become known in the context of the method mentioned in the beginning. The output material from the refiner 16 is again dewatered mechanically, for instance by means of a centrifuge. Service water with fine fractions arrives in a fine sieving, wherein the service water is guided to waste water treatment as was already described for the first stage. Even the process in the second refiner stage can be recycled, as indicated by the line. The dewatered output material, which has a certain fineness degree, arrives in a dryer. It is dealt with an air dryer, which serves as a wind sifter at the same time. The material discharged with the drying air arrives in a sieving- or filtering apparatus 82. The product of sieving or filtering, respectively, can be supplied to a suitable usage, for instance the production of wood plastic composites, as was already described above. The remaining product, freed from wood pulp and fine grinding product, is then supplied to its further usage via 84. It is still mentioned that the wood pulp/plastics fraction from the sieving apparatus or the filtering apparatus, as it is discharged at 86, can still be subjected to a further drying, in a dispersion dryer for instance. When the wood pulp has been removed to a great extent through a preceding separation, the input product of the dryer can be separated into flakes and grainy product. The flakes accumulate in the filter, and the grainy product is conveyed out of the dryer.

Figure 3:
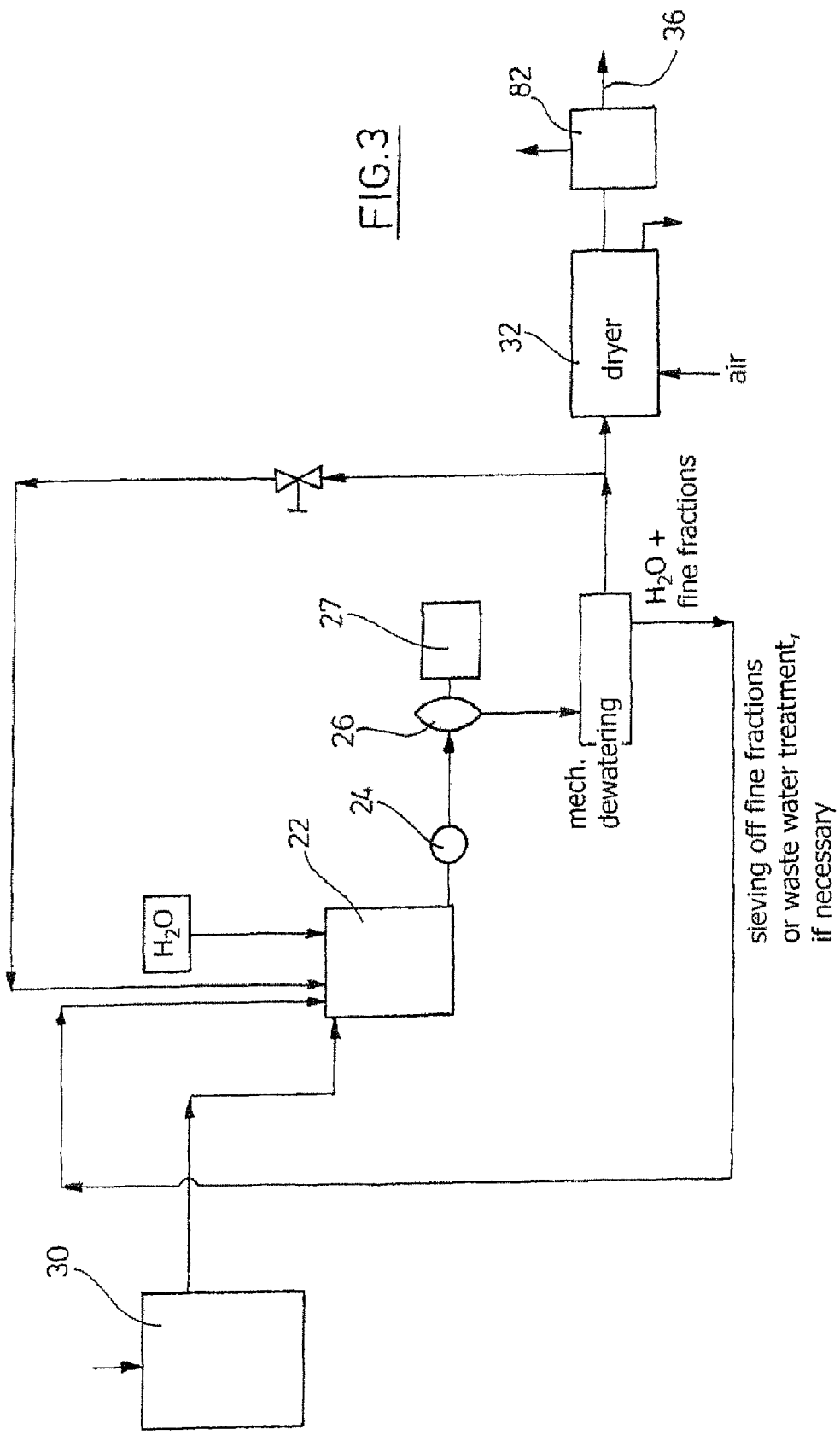
FIG. 3 shows a plant scheme concerning the use of a toothed disc refiner stage of the present invention, subsequent to a conventional grinding process.

In FIG. 3, parts of the plant scheme have been taken from the plant scheme after FIG. 1 or 2. Therefore, same parts are provided with same reference signs. The peculiarity in FIG. 3 is that relatively incompacted compacted mass is used as the starting material. The output material from the reservoir 30 is fed into the water container 22, and from there it is supplied to the toothed disc refiner 26 via the solids handling pump, which purifies the flakes and shreds pieces from thicker plastics parts. The drying process and the separation of wood pulp are similar to the process which was described by means of FIG. 2. For this reason, it will not be dwelled on this in detail.

Figure 4:
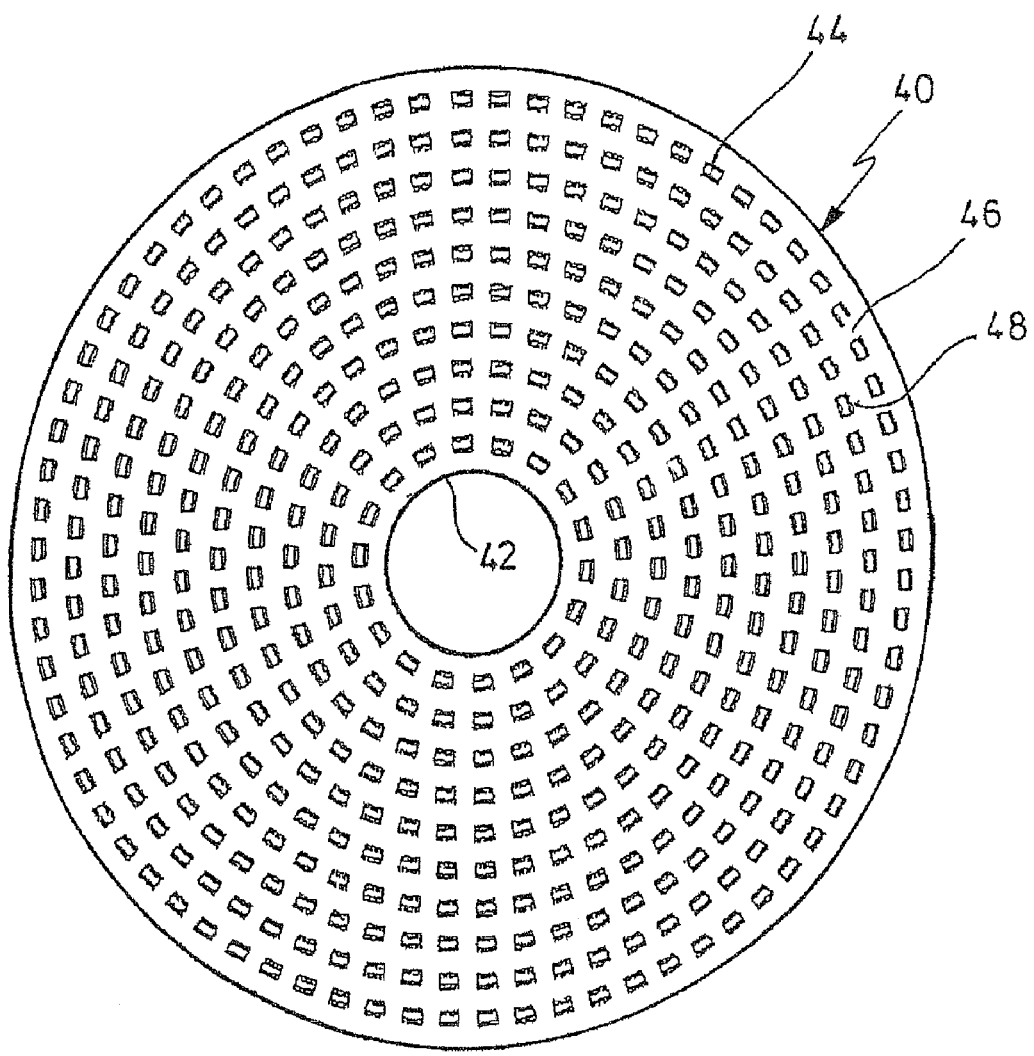
FIG. 4 shows the top view on a disc of the toothed disc refiner for use in the present invention.
Figure 5:
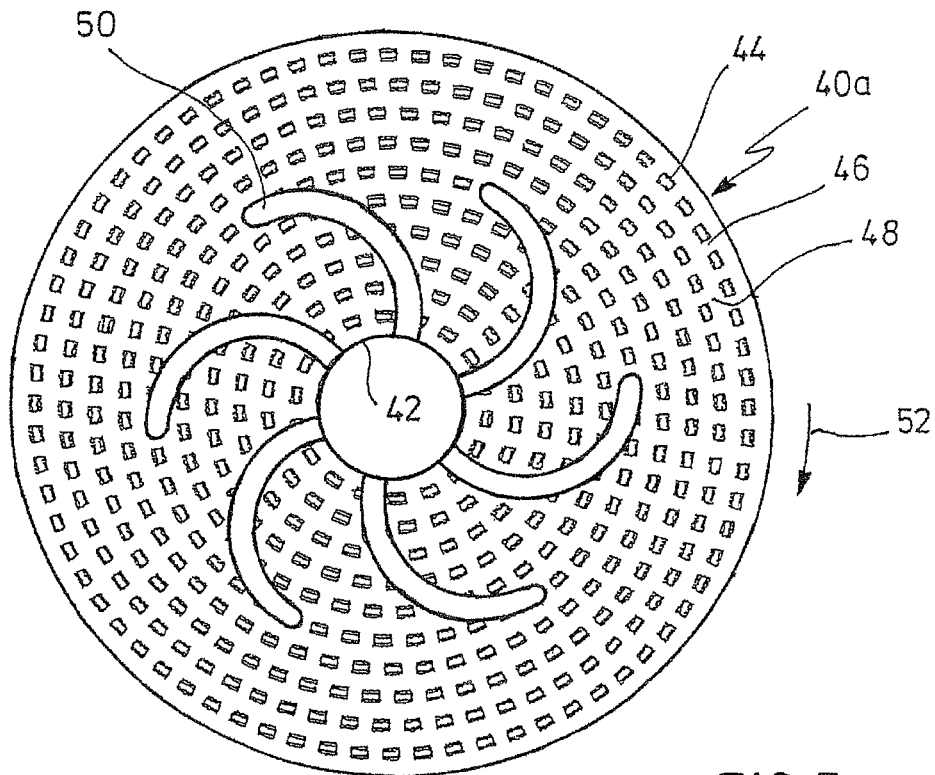
FIG. 5 shows a modification of the toothed disc after FIG. 4.
Figure 6:
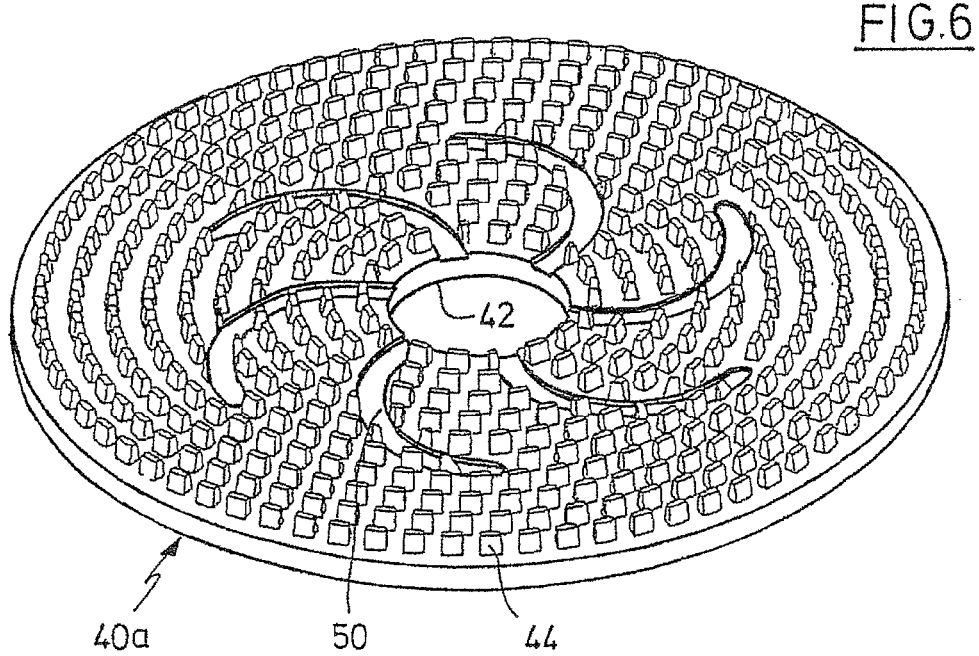
FIG. 6 shows the toothed disc after FIG. 5 in a perspective view.

By means of FIGS. 4 to 6 and 8, details of the toothed disc refiner 26 according to FIG. 1 to 3 will be explained. A top view on a disc 40 of the toothed disc refiner is shown in FIG. 4. In the present case, it is that disc of a pair of toothed discs via the central opening 42 of which product to be shredded is supplied. Teeth 44 are formed from the disc 40 in ten circles, which are arranged concentrically. The disc 40 is flat between the teeth 44. The teeth, which may have various shapes, each have a distance 46 one from another on a circle, which is approximately equal in the shown case, but can also decrease from the inside towards the outside. Between the circles, the teeth have a distance 48. Even the same can decrease from the inside towards the outside. In the grinding process, water and product to be ground, namely flakes and smaller three-dimensional plastic pieces, arrives in the region between two adjacent tooth discs via the opening 42, wherein the tooth arrangement of the second disc, which is not shown in FIG. 5, is arranged such that the tooth rows can mesh. The distances 46, 48 and the distance of co-operating tooth discs is dimensioned such that the respective product to be ground can pass through freely, so that clogging is avoided. For this reason, the distances 46, 48, and also the distance between co-operating tooth discs can decrease from the inside towards the outside, because the grains of the product become smaller from the inside towards the outside. This can be recognised in FIG. 8. The thickness of the toothed disc 40 increases continuously from the opening 42 towards the outside.

The toothed disc 40 after FIG. 5 differs from that one after FIG. 4 in that starting from the supply opening 42, several channels 50 are formed in, which have approximately the form of an arc of a circle, the bend being such that the ends of the channels 50 point into opposite rotational directions, as is indicated by the arrow 52. The channels 50 have a width that is slightly or somewhat greater than the width of the greatest flakes or plastic pieces that are supplied via the supply opening 42. The channels 50 have their greatest depth adjacent to the supply opening 42, and gradually diminish in depth, running down into the toothed disc plane at their end. This end is approximately on the half radius of the toothed disc 40.

Figure 7:
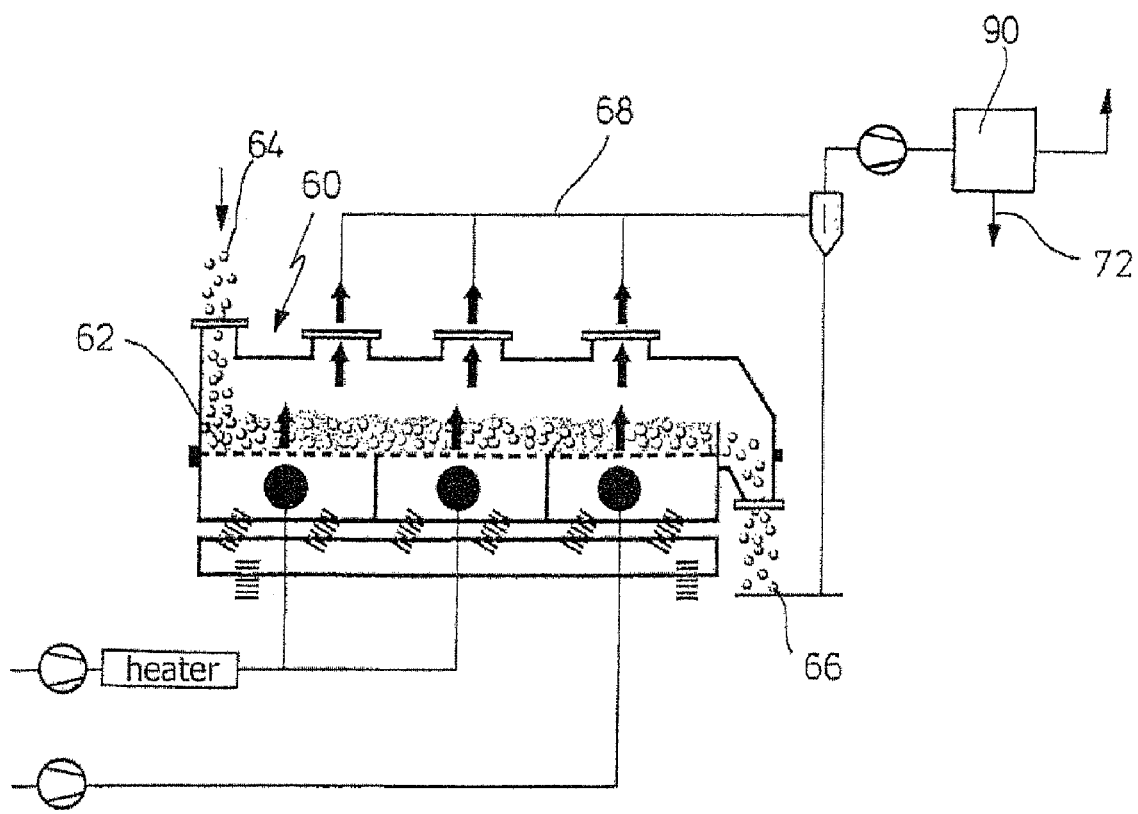
FIG. 7 shows schematically the drying and air sifting at the end of the grinding process of waste plastics.
Figure 8:
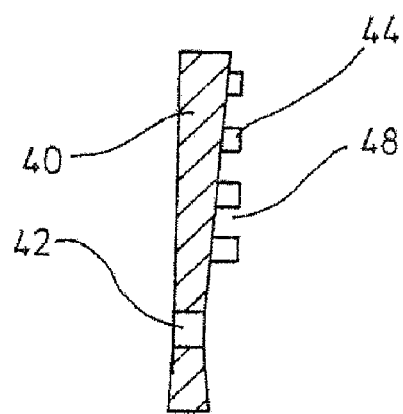
FIG. 8 shows schematically a partial section through a toothed disc according to FIG. 4.

A fluid bed dryer is schematically shown in FIG. 7, as the same can be used on the junction after the embodiments after FIGS. 2 and 3. It is designated as a whole with 60. A longitudinal housing is subdivided in the longitudinal direction by a horizontal sieve or grid 42, which bears the shredded ground product 64 on its topside. Below the sieve 62, warm air coming from a heater is supplied. In the next third, cold air is supplied. The longitudinal housing is set into vibration in a suitable manner, so that the product moves forward as a bed from left to right on the sieve 62. Such a fluid bed dryer is per se known. The dried product reaches the outside at 66 on the right end of the fluid bed dryer and is collected in suitable containers. The input product 64 contains flakes and grainy plastics. The flakes are guided to a sieve or filter 70 via the line 68, where they are collected. The sieve fraction is guided to further processing via 72, if necessary after further drying by way of a dispersion dryer for instance. Further processing takes place by regranulation for instance. Grain- and flake material on their part can still be separated into types of plastics, wherein per se known separation methods are used.

In the case that wood pulp comes along into the input material 64, the same is segregated by way of the sieve or filter 60, whereas the entire purified plastic material is discharged into the fluid bed dryer at 66. In this case, other separation conditions have to be set in the fluid bed dryer than in the separation of the flakes from the grain material.

At the supply opening, the changeable distance of the tooth discs is sufficiently large to permit entrance of the product without interruption.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method for the removal of wood pulp and other adhering substances from waste plastics in the recycling of all types of waste plastics, in which foils and pieces from thicker plastic parts of if necessary pre-sorted waste plastics are mechanically pre-shredded into flakes or particles up to a preset size, wherein oversizes are sorted out, the shredded product is charged into a disc refiner together with water, wherein the proportion of flakes and other particles is at least 10% of the total volume, substances adhering on the flakes are rubbed down by the co-operating discs of the refiner to a large extent, and are then present as separate substances, and the substances rubbed down are separated from the plastic particles by a suitable separation method.

2. A method according to claim 1, characterised in that the substances which are rubbed down are predominantly wood pulp.

3. A method according to claim 1, characterised in that dewatered output product of the disc refiner is subjected to wind sifting in an air dryer, wherein the wood pulp is either extracted previously or is separated from the grainy material together with the flakes.

4. A method according to claim 3, characterised in that the dried flakes and grains are separated in a fluid bed dryer.

5. A method according to claim 3, characterised in that the wood pulp is discharged with the dry air of a dryer, and collected in a sieve or filter.

6. A method according to claim 1, characterised in that after mechanical dewatering and if necessary removal of fine fractions, the output product is charged into a sink-float tank, in which a separation of the wood pulp and those particles having a specific gravity>1 from plastic particles having a specific gravity<1 is performed, or the separation cuts are set to density cuts greater than 1, according to necessity, by way of suitable salt solutions.

7. A method according to claim 1, characterised in that after mechanical dewatering and if necessary removal of fine fractions, the output product is charged into a sorting centrifuge in which wood pulp and plastic particles are separated from each other.

8. A method according to claim 1, characterised in that the wood pulp is separated from the output product by geometric sieving, further wherein a wood pulp suspension is removed by negative pressure.

9. A method according to claim 1, characterised in that a toothed disc refiner is used, whose discs feature meshing teeth, which are arranged at a distance one from another in concentric circles, wherein the gaps between the teeth of a circle are sufficiently great to allow the free passage of pieces of thicker or more solid material, or of the product already ground up to then, respectively.

10. A method according to claim 1, characterised in that a cutter disc refiner is used, wherein the distance of the discs approximately corresponds to the thickness of the flake material without adhering substances.

11. A method according to claim 1, characterised in that before charging it into the disc refiner, the pre-shredded material is charged with water into a slushing drum, and removed wood pulp fibres are separated.

12. A method according to claim 1, characterised in that the waste plastics or the flakes or the pieces having greater thickness is/are sorted according to the type of plastics, and pre-sorted types of plastics are supplied to the disc refiner.

13. A method according to claim 1, characterised in that undesired types of plastics are sorted out from the waste plastics or the flakes or the pieces having greater thickness.

14. A method according to claim 1, characterised in that flakes and/or bodies of the dried output product are sorted according to the type of plastics.

15. A method according to claim 1, characterised in that the output product is at least partially recycled to the disc refiner.

16. A method according to claim 1, characterised in that incompactly compacted material of waste plastics is shredded in a preceding disc refiner in a first grinding process, and the ground product of the preceding refiner is charged into a further disc refiner and shredded there.

17. A method according to claim 1, characterised in that the output product of the disc refiner is supplied to a further disc refiner stage after mechanical dewatering.

18. A method according to claim 1, characterised in that the output product of the second refiner is supplied to the separation process without dewatering.

19. A method according to claim 1, characterised in that when using a toothed disc refiner, the first tooth circle starting from the central supply opening is arranged in a radial distance from the supply opening, in order to form an intake zone.

20. A method according to claim 19, characterised in that the disc area of the intake zone is persistently flat up to the first tooth circle.

21. A method according to claim 1, characterised in that a toothed disc refiner is used in which the distance of the disc areas decreases radially towards the outside continuously, starting from the central supply opening.

22. A method according to claim 1, characterised in that a toothed disc refiner is used in which a radially outer region of the discs features radial or approximately radial grinding segments, spaced apart in the rotational direction.

23. A method according to claim 22, characterised in that barriers are arranged between the grinding segments, such that the ground grains and/or flakes are directed towards the neighbouring disc.

24. A method according to claim 1, characterised in that a toothed disc refiner is used in which channels are formed into the toothed discs, starting from the central supply opening in the perimeter distance of the supply opening, which extend towards the outside over a certain path.

25. A method according to claim 24, characterised in that the depth of the channels decreases from the inside towards the outside.

26. A method according to claim 24, characterised in that the channels are arc-shaped, wherein the outer end of the arc-shaped channels points opposite to the rotational direction.

27. A method according to claim 1 wherein the waste plastics comprises mixed plastics.

* * * * *